United States Patent Office 3,565,849
Patented Feb. 23, 1971

3,565,849
POLYURETHANES
Timothy V. Peters, Tewkesbury Township, N.J. (Rte. 2, Rockaway Road, Lebanon, N.J. 08833)
No Drawing. Continuation-in-part of applications Ser. No. 216,735, Aug. 14, 1962, and Ser. No. 340,548, Jan. 27, 1964. This application Jan. 8, 1968, Ser. No. 696,097
Int. Cl. C08g 22/28, 41/00, 51/44
U.S. Cl. 260—32.6                                           14 Claims

ABSTRACT OF THE DISCLOSURE

Polyurethane solutions, useful in making finished shaped articles, particularly filaments having high resistance to heat, light and chlorine, are produced with fast reacting, lower-alkyl, diprimary diamine chain extenders, such as ethylenediamine or propylenediamine. By prior solution polymerization methods, gelling invariably results with the utilization of such fast reacting, lower-alkyl, diprimary diamine chain extenders. The method of producing polyurethanes of this invention involves a first step of reacting in solution a difunctional isocyanate terminated urethane prepolymer with a moderately fast reacting chain extender selected in accordance with the gel test hereinafter described. The resulting intermediate polymer solution is then reacted in a second step with (1) a fast reacting straight-chain, lower-alkyl, diprimary diamine chain extender and (2) additional isocyanate terminated prepolymer.

---

This application is a continuation-in-part of the application of T. V. Peters, S.N. 216,735, filed Aug. 14, 1962 and the application S.N. 340,548, filed Jan. 27, 1964, both abandoned.

This invention relates to polyurethanes and more particularly, to polyurethane solutions and methods of producing them.

Chain extended polyurethane solutions have heretofore been produced, in general, by one of the following methods:

(1) An isocyanate terminated prepolymer is reacted in bulk with a chain extending agent, for example, a glycol or diamine or other compound containing at least two active hydrogens. The resulting polymer is then dissolved in a suitable solvent.

(2) An isocyanate terminated prepolymer is reacted with a chain extending agent in the presence of a solvent.

The first method is limited to moderate reacting chain extenders, such as polyether or polyester glycols and aromatic diamines, since the reaction is exothermic and cannot be readily controlled for fast reacting systems. The solution step generally requires heat and extended high shear stirring which often leads to undesirable polymer degradation.

The second method is applicable to faster reacting chain extenders than those useful in the first method; however, the second method does not work well with fast chain extenders such as aliphatic diamines. In such fast reacting systems gel structures almost invariably result. These can frequently be redissolved by high shear stirring and heat, but this again leads to partial polymer degradation which severly limits the usefulness of the second method.

It has been recognized that superior mechanical properties are obtained only with chain extenders which effectuate short segments in the polymer chain exhibiting high degrees of interaction with other such segments of the same and neighboring polymer molecules. The moderately fast reacting chain extenders which are useful in the second method are generally hindered or ring-type diamines such as piperazine and menthane diamine. The rings or hindering side groups tend to reduce the desired intermolecular attraction forces within the polymer molecule. Chain extenders, such as ethylene diamine, tetramethylene diamine and propylene diamine, which do not have significant force disrupting groups and therefore should give polyurethanes with superior mechanical properties nevertheless cannot be utilized to give good quality polymer solutions by those two prior methods because of their fast reaction rates with isocyanates to give gel structures with the disadvantages stated above.

In accordance with this invention, fast reacting chain extenders, such as ethylene diamine, may be used in the production of polyurethane solutions without the disadvantages discussed. In addition, the novel polymers resulting from the practice of the method of this invention have increased resistance to heat, light and chlorine and other improved properties over those produced by the above described methods of chain extension.

The method of this invention produces a polyurethane solution in two steps. The first step comprises reacting in the presence of a solvent a substantially difunctional isocyanate terminated prepolymer desirably having a molecular weight of 1000 to 4000, and preferably 1500 to 3500, with approximately, a stoichiometric amount of a moderately fast reacting chain extender diamine or a glycol. The moderately fast reacting chain extender may comprise a single chain extender or a plurality of such chain extenders. The substantially difunctional isocyanate terminated prepolymer is a reaction product of a diisocyanate and one or more polyether glycols, polyester glycols or a mixture of polyether glycols and polyester glycols. The fast reacting diamine may be one or more diprimaryamines, disecondaryamines or mixtures of both. The moderately fast reacting chain extender does not effect gelation in a test later described. Examples of the moderately fast reacting chain extenders are a piperazine such as 1,4-diamine 2-methylpiperazine; a methylimino-bisaliphaticamine; a glycol such as ethylene glycol; or a mixture of glycols. Desirably, the amount of the moderately fast reacting diamine chain extender is 100 to 125% of the stoichiometric quantity required. The reaction in this first step produces a still reactive intermediate polymer solution. Desirably, the solids content of the intermediate polymer solution is approximately 20 to 25%.

In the second step of the method in accordance with this invention, the intermediate polymer solution is reacted with a substantially difunctional isocyanate terminated prepolymer prepared as in the first step and a fast reacting diamine such as ethylenediamine to obtain a polyurethane solution. The fast reacting diamine may comprise one or more diprimaryamines or disecondaryamines. Desirably, the reaction is conducted in the presence of additional solvent such as 3 to 6 parts by weight of additional solvent for each part by weight of the intermediate polymer solution. For terminating the chain extension, it is also advantageous to add a monofunctional amine such as diethanolamine in an amount not to exceed 8–10 mole percent of the total chain extenders including the chain extenders employed in the first step. Preferably, the ratio of the fast reacting chain extender to the moderately fast reacting chain extender is approximately 4 to 1. Desirably, the molar ratio of total prepolymer to the total chain extenders and chain terminators is within 2%, and preferably within 1% of the stoichiometric amount. The finished polymer solution may be wet or dry spun to produce a polyurethane filament with significant resistance to heat, light and chlorine. Such polymer solution may also be employed to produce different shaped articles such as films.

In a preferred manner of practising the method of this invention, the prepolymer is added to the chain extender in solution in each step. In the first step of this method, an isocyanate terminated prepolymer in an amount slightly less than the stoichiometric amount is reacted in a solvent with a moderately fast reacting chain extender. For example, the prepolymer is reacted in a solvent with a diamine such as hydrazine, piperazine, diamino-piperazine, methyliminobispropylamine or 1,4-diamino 2-methylpiperazine, or mixtures thereof, or a glycol such as ethylene glycol, or a mixture of glycols to produce a still reactive polymer solution. This solution or a portion of it is reacted with a fast reacting diamine and additional prepolymer. Desirably, the still reactive intermediate polymer is diluted with additional solvent in a ratio, for example, of one part by weight of solution to four parts by weight of solvent and then a very fast reacting diamine, such as ethylene diamine, is added to the diluted solution, followed by the addition of additional prepolymer in an amount slightly less than the stoichiometric amount based on the second chain extender. The solution formed contains a high molecular weight block copolymer terminated by diamine residues. The solution has good rheological properties and is stable. Use of about one mole of the first chain extender for each four moles of the second chain extender appears to be optimum in most cases.

In an alternative method of practising this invention, the moderately fast reacting chain extender is added to a solution of the isocyanate terminated prepolymer to produce an intermediate polymer. The solution of the intermediate polymer is mixed with additional prepolymer, preferably after dilution with a solvent, and to this mixture is added the second, fast reacting chain extender. In this alternative, the amount of each chain extender added is slightly less than the stoichiometric amount, based on the respective prepolymer. This alternative, in general, produces polymer structure similar to those obtained by use of the preferred method, except that the molecules are terminated by isocyanate groups rather than by diamine residues. The method of adding in each step the prepolymer to the chain extender in solution and maintaining such chain extender in slight excess of the stoichiometric amount of the respective prepolymer is preferable.

The new polymer compositions resulting from the practice of this invention are primarily high molecular weight block copolymers. They may be represented by the following formula:

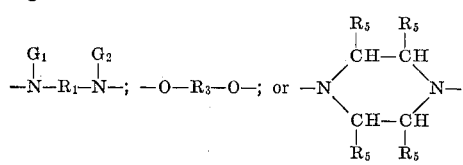

in which Q is a bivalent organic radical having one of the following formulas:

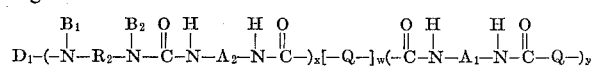

$D_1$ and $D_2$ are hydrogen or a monovalent radical having one of the following formulas:

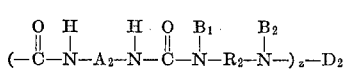

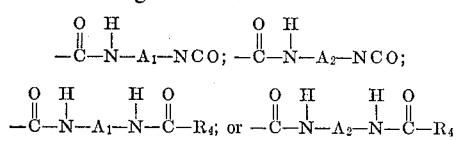

in which $A_1$ and $A_2$ desirably have molecular weights of 1000 to 4000 and are residues, after the removal of terminal isocyanate groups from the reaction product of an excess of a diisocyanate with a polyester glycol, polyester glycol and a mixture of one or more polyester glycols and one or more polyether glycols and $B_1$, $B_2$, $G_1$ and $G_2$ are hydrogen or monovalent organic radicals free of hydrogen atoms more active than hydroxyl hydrogen and free of groups freely reactive with active hydrogen; $R_1$ and $R_2$ are different bivalent organic radicals free of hydrogen atoms more active than hydroxyl hydrogen; $R_3$ is a bivalent organic radical free of active hydrogen atoms; $R_4$ is a monovalent organic radical which is a residue after the removal of an amine hydrogen from an organic compound containing at least one hydrogen attached to the amine nitrogen and otherwise free of hydrogen atoms more active than hydroxyl hydrogen; $R_5$ is hydrogen or a lower alkyl radical; and at least one of $x$, $y$ and $z$ is a positive integer and the remaining two are positive integers or zero and when $y$ is $o$, $w$ and $x$ are 0 and when $y$ is a positive integer $w$ is 1.

Each of the polyurethane solutions produced by the practice of this invention contains a mixture of different species of high molecular weight polyurethanes, each species having the above formula. The resulting filament spun from such polyurethane solution contains a mixture of different species of high molecular weight polyurethane, each species having the above formula.

The block copolymers resulting from the practicing of the preferred method in which a diamine is employed in the first chain extension step are represented by the above formula, but in that case Q is either of the following formulas:

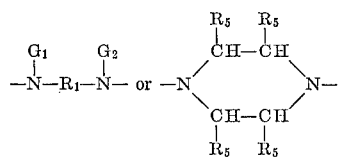

and $D_1$ and $D_2$ are hydrogen or the monovalent radicals containing $R_4$ and may be the same or different.

In the first step of the method of this invention, a moderately fast reacting chain extender, a diamine or a glycol is used. The applicability of a given chain extender for this first step in the process must be in general be determined experimentally by reaction in solution with the prepolymer to be used. A useful chain extender must react with the prepolymer in solution to produce a viscous, homogeneous solution essentially free of gel particles. It has been found, for example, that diamines with higher reactivities than piperazine are generally not applicable. Hydrazine, however, is an exception to this general rule, since in this diamine the first amine group reacts very fast but the second amine group in the molecule reacts considerably slower so that the overall effect is of a diamine with a reactivity similar to piperazine. Hydrazine does not produce gel particles when so tested.

Suitability of a given diamine for use as a moderately fast reacting diamine in the first step of chain extension of the method of this invention may be determined by reaction with a "standard" prepolymer. In the test described, hereinafter called the gel test, acceptable diamines yield viscous polymer solutions essentially free of gel particles.

The "standard" prepolymer is prepared by adjusting an essentially bifunctional polypropyleneadipate glycol having a molecular weight of about 2000 to a moisture content of 0.05% and the adjusted glycol is then reacted with 100% molar excess of methylenebis(paraphenylisocyanate). Reaction is carried out at 100° C. for 1 hour. The product is diluted to 80% solids with dimethylformamide containing less than 0.03% water.

0.1 mole of the test diamine is mixed with 800 ml. of dimethylformamide and 0.005 mole of diethanolamine. This mixture is then stirred at a high shear rate while the "standard" prepolymer is added until a viscosity of 50–100 poises is attained or until gelation begins to occur.

In most cases unacceptable diamines for the first step of the process of this invention produce gelation immediately. The results of the testing of some diamines are as follows.

| Diamine: | Acceptable |
|---|---|
| Hydrazine | Yes |
| Ethylenediamine | No |
| Propylenediamine | No |
| Hexamethylenediamine | No |
| Methyleneiminobispropylamine | Yes |
| Piperazine | Yes |
| Diaminopiperazine | Yes |
| Metaxlylenediamine | Yes |

Examples of other moderately fast reacting diamines for the first step of the process of this invention are N,N' - dimethyl - 1,3 - diaminopropane, 2,3 - di(3-aminopropoxy)butane, $\beta,\beta'$ - (3 - aminopropoxy)diethylether, 1,4 -bis(3 - aminopropyl)piperazine and N - aminoethylpiperazine. These diamines do not manifest gelling when tested as described and are therefore satisfactory for use in the first step of the process of this invention.

Useful fast reacting diamine chain extenders for the second step of the process of this invention are the straight-chain, lower-alkyl, diprimary diamines containing two through six carbon atoms and having the two amino groups attached to the two terminal carbon atoms of the chain. These are: 1,2-diaminoethane (commonly called ethylenediamine), 1,3-diaminopropane (sometimes called propylenediamino), 1,4-diaminobutane, 1,5-diaminopentane and 1,6-diaminohexane (commonly called hexamethylenediamine).

The utilization of these fast reacting diamines as chain extenders in the second step of this invention results in excellent mechanical properties in the finished shaped articles, particularly filaments.

A wide variety of prepolymers may be used in carrying out the method of this invention. The preferred active hydrogen-containing materials useful in preparing the prepolymer are polyalkyleneether glycols, polyester glycols and mixtures thereof. The most useful glycols have molecular weights between 500 and 5000, preferably between 1000 and 3000, and are not appreciably soluble in water. When one or more such glycols are reacted with one or more diisocyanates such as those later noted herein, which have molecular weights of the order of 150 to 250, the prepolymer would have a molecular weight of the order of 1000 to 5500, desirably 1000 to 4000 and preferably 1500 to 3500. The glycols or mixture of glycols used should have a melting point below 50° C. for the best results.

Examples of useful polyether glycols are polypropyleneether glycol, polytetramethyleneether glycol, polypropyleneethyleneether glycol, polyhexamethyleneether glycol and polymonomethyleneether glycol. Polyethyleneether glycol is often used in mixtures with other polyether or polyester glycols, but rarely alone because of its relatively high water solubility.

Polyester glycols useful in this invention are in general prepared by reacting suitable amounts of low molecular weight glycols with dicarboxylic acids, diacid chlorides, or diesters. Examples of suitable glycols are ethylene propylene, tetramethylene, neopentyl and xylylene glycols. Dicarboxylic acids useful in forming the polyesters glycols are: succinc, adipic, suberic, sebacic, azelaic and tetraphthalic acids. Mixed polyester glycols formed by using mixtures of low molecular weight glycols and/or dicarboxylic acids are also useful.

The diisocyanate used in preparing each prepolymer may be aromatic, aliphatic, or cycloaliphatic. Aromatic diisocyanates, i.e. diisocyanates in which the isocyanate groups are directly attached to aromatic ring structures, are preferred because of their generally higher reaction rates. Examples of acceptable diisocyanates are: tolylene-2,4-diisocyanate, p-phenylene diisocyanate, methylenebis (4-phenyl isocyanate), 1,6-hexamethylene diisocyanate, and 1,4-cyclohexylene diisocyanate. Mixtures of diisocyanates may also be used.

In forming a prepolymer to be used in the improved method of this invention, the exact proportion of diisocyanate employed to react with, for example, the polyether or polyester glycol must be selected on the basis of the particular combination of reactants used and the desired end product properties. In most cases, however, between 1.5 and 2.5 isocyanate groups should be present for each active hydrogen. Particular reaction conditions for forming the prepolymer are also dependent on these same factors. A prepolymer may be prepared by mixing one mole of 2000 molecular weight polypropyleneether glycol, one mole of 2000 molecular weight poly(neopentyladipate) glycol, and 4.2 moles of methyl bis(4-phenyl isocyanate), heating the mixture to 90° C. and maintaining this temperature for three hours.

In general, the process of this invention may be more conveniently carried out if a portion of the solvent is mixed in with the prepolymer prior to chain extension. This serves to reduce the viscosity of the prepolymer and facilitates mixing and transfer. In general, solvent concentration in the prepolymer-solvent mixture prior to chain extension should be about 10–25% by weight.

In the first step of the method of this invention, the isocyanate terminated prepolymer may be slowly added to the chain extender solvent mass or the chain extender may be added to a prepolymer solvent mass, but it is preferred to add the prepolymer to the chain extender dissolved in solvent.

Suitable chain extenders for use in the first step of the method of this invention include hydrazine, monosubstituted hydrazine, symmetrically disubstituted hydrazine, piperazine, substituted piperazines, diamine piperazine, substituted diamine piperazines, cycloaliphatic diamines, methyliminobisaliphatic amines and sterically hindered diamines, and mixtures thereof. Piperazine and 1,4-diamino 2-methyl piperazine are preferred compounds for chain extension in the first step. Other moderately fast reacting diamines and glycols, such as ethylene glycol, may also be used, but it is preferred to use diamines for this step of chain extension as they give a polymer having better properties such as dyeability, and use of a glycol requires essentially anhydrous conditions.

A conventional polyurethane solvent, such as dimethylformamide, dimethylacetamide, or dimethylsulfoxide, is used.

After the first step of chain extension, the resulting intermediate polymer solution, which is still reactive, preferably has a viscosity of between 40 and 700 poises and a solids content preferably between 20 and 25 percent. Additional conventional solvent for the polymer, such as dimethylformamide, dimethylacetamide or dimethylsulfoxide, is then added, in the range of about 3 to about 6, preferably about 4, parts by weight of solvent to one part by weight of such polymer solution. Following the preferred alternative method of this invention, to this dilute polymer solution is then added the very fast reacting diamine followed by additional prepolymer and the mixture is reacted in an otherwise conventional manner to give a viscosity of about 40 to 700 poises and a solids content preferably between 20 and 25 percent.

In this second step of chain extension any very fast reacting diamine, such as ethylene diamine, propylene diamine or other aliphatic diamine, may be used. It is preferred to use ethylene diamine.

Of the total amount of chain extender used, the first extender should constitute about 10–40 mole percent of that total, and it has been found that use of about 20 mole percent of the first extender is optimum.

This polymer solution may then be wet or dry spun by conventional techniques to give an elastomeric filament having improved heat stability and light and chlorine fastness or may be used to form other shaped articles, such as films or castings.

Different isocyanate terminated prepolymers may be used in the two chain extension steps, and a combination of chain extenders, and a combination of prepolymers, may be used in either or both such steps.

It is not necessary that the additional solvent required in the second step chain extension be added after the first step. It may be carried through the first step as excess. In this event total solids present after the first step chain extension is in general 4–5% and the viscosity 1–10 poises.

A chain terminating compound containing only one secondary or primary amine group may be used in the manner known in the art to control polymer solution quality. Such a compound may be added with the chain extender and may be added in either or both chain extension steps but should not be present in an amount in excess of 8–10 mole percent of the total chain extender used. In most cases optimum concentration of such a compound is less than 5 mole percent. Examples of useful compounds are: dimethylamine, diethylamine, diethanolamine, N,N-dimethyl-1, 3-propanediamine.

Dyes, pigments, antioxidants, stabilizers and other additives may be incorporated in the polyurethane by addition at any stage before formation of the shaped article, but are preferably added to the polymer solution after the second step of chain extension. If any such compound is to be added prior to the second step, it must be essentially inert to isocyanate and active hydrogen.

A more comprehensive understanding of this invention is obtained by reference to the following examples. Unless otherwise indicated, all quantities given in the examples are on a weight or weight percent basis.

EXAMPLE 1

(A) Prepolymer: 800 g. of hydroxyl terminated 2000 mol. wt. poly(propyleneadipate) glycol were mixed with 400 g. of 2000 mol. wt. polypropyleneether glycol and 305 g. of methylene bis(paraphenylisocyanate). The mixture was then heated for two hours at 100° C. with constant agitation to form an isocyanate terminated prepolymer.

(B) First step chain extension: The above prepolymer was diluted with 400 g. of dimethylformamide. A portion of this diluted prepolymer was then added slowly with vigorous stirring to a mixture of 1000 g. dimethylformamide, 8.2 g. piperazine, and 0.05 g. diethanolamine until a viscosity of about 60 poises was attained.

(C) Second step chain extension: 400 g. of the above first step polymer solution was blended with 1350 g. dimethylformamide, 6.5 g. ethylene diamine, and 0.4 g. diethanolamine. To this mixture was then slowly added with rapid agitation a portion of the diluted prepolymer from "B" above until a viscosity of 800 poises was reached. 40 g. of a 33% titanium dioxide dispersion in dimethylformamide was finally added (about 2.5% of total solids) and the viscous polymer solution degassed under vacuum.

(D) Filament formation: The pigmented second step polymer solution from "C" was filtered and forced at a constant speed by means of a precision gear pump through a spinnnerette having a plurality of 0.005″ diameter orifices and submerged in a 25% aqueous dimethylformamide spinning bath. The semiplastic monofilaments which formed as the polymer solution entered the bath were brought together to form a single coalesced multifilament which was then conducted by means of driven rolls through a series of heated wash baths then to a continuous belt dryer and finally to a spooling device. The continuous, coalesced multifilament thus formed was not noticeably discolored on exposure for one hour to 200 p.p.m. aqueous active chlorine at 60° C. and had the following physical properties: tenacity, 0.45 g.p.d.; elongation, 650%, and retractive force at 200% elongation, 0.16 g.p.d.; −10% tenacity change after heating for 30 minutes at 150° C.

EXAMPLE 2

(A) Second step chain extension: A portion of the diluted prepolymer from 1.B was slowly added to a vigorously agitated mixture consisting of 300 g. first step polymer solution from "1.B," 1000 g. dimethylformamide, 0.3 g. diethanolamine and 7.0 g. 1,2-diaminopropane. Addition was halted after a viscosity of 300 poises was attained and 34 g. of a 33% titanium dioxide dispersion in dimethylformamide was added, consisting about 2.5% of total solids.

(B) Filament formation: Filaments produced as in "1.D" above showed only slight discoloration on exposure to 200 p.p.m. aqueous active chlorine for one hour at 60° C. and had the following properties: tenacity, 0.28 g.p.d.; elongation, 700% and retractive force at 200% elongation, 0.9 g.p.d.; and +5% tenacity change after heating for 30 minutes at 150° C.

EXAMPLE 3

(A) First step chain extension: 200 g. of a prepolymer prepared as in "1.A" above was thoroughly mixed with 650 g. of dimethylformamide. To this mixture was added with rapid stirring a solution of 10 g. of N,N′-diamino-2-methylpiperazine and 0.2 g. diethanolamine in 150 g. of dimethylformamide until a viscosity of 400 poises was attained.

(B) Second step chain extension: 300 g. of the above first step polymer solution was mixed with 800 g. of dimethylformamide and 250 g. of the same prepolymer used in "3.A." To this mixture was then slowly added with rapid stirring a solution of 7 g. ethylene diamine and 0.5 g. diethanolamine in 200 g. of dimethylformamide until a viscosity of 60 poises was reached. 35 g. of a 33% dispersion of titanium dioxide in dimethylformamide was blended in with the viscous solution, constituting about 2.5% of total solids.

(C) Filament formation: Filaments produced as in "1.D" discolored quite noticeably when exposed to active chlorine as in "1.D." Mechanical properties were as follows: tenacity, 0.6 g.p.d.; elongation, 550%; retractive force at 200% elongation, 0.18 g.p.d.; −20% tenacity change after heating for 30 minutes at 160° C.

EXAMPLES 4–10

A prepolymer was prepared as in "A" of Example 1 except that the molar ratio of 2000 molecular weight polyether glycol to the 2000 molecular weight polyester glycol was 2:1 rather than 1:2. A series of fiber samples were then prepared using different diamines for the first step chain extension and ethylene diamine for the second step chain extension. Molar ratios and the procedure were the same as used in Example 1. Each sample contained about 2.5% titanium dioxide by weight.

For comparison purposes, a portion of this same prepolymer was also chain extended in a single step with a 19:1 molar mixture of ethylene diamine and diethanolamine in sufficient dimethylformamide to give a 20% solids polymer solution. The solution formed was highly nonhomogeneous containing solid gel particles in a low viscosity liquid phase. This suspension was then heated to 90° C. and held for two hours with rapid agitation to form a relatively homogeneous solution with a viscosity of 90 poises. This solution from the single step method was spun to produce a fiber sample as in Example 1, also containing about 2.5% titanium dioxide by weight. The resulting fiber is referred to in the accompanying table as a control.

Properties of the resulting fibers are summarized below (ratios shown are molar):

| Example | First Step Chain Extender | Tenacity (g.p.d.)/ elongation (percent) | Chlorine 200 p.p.m., ½ hr. 60° C. | Heat 150° C. ½ hr., percent tenacity change |
| --- | --- | --- | --- | --- |
| 4 | Piperazine | 0.51/650 | Slight yellow | −10 |
| 5 | Menthanediamine | 0.35/720 | No effect | −20 |
| 6 | N,N'-diamino-piperazine. | 0.62/580 | do | 0 |
| 7 | N,N'-diamino-2-methylpiperazine. | 0.55/620 | Very slight yellow. | 0 |
| 8 | 4/1 methylimino-bispropylamine/N,N'-diamino-2-methyl-piperazine. | 0.60/680 | No effect | +5 |
| 9 | 9/1 methyliminobis-propylamino/N,N'-diamino-2-methyl-piperazine. | 0.55/700 | Slight yellow | −5 |
| 10 | 4/1 N,N'-diamino-piperazine/methyl-iminobispropylamino. | 0.50/550 | No effect | +10 |
| Control | Chain extended in single step with ethylene diamine. | 0.25/800 | Yellow | 60 |

Comparison of the properties of samples from Examples 1–10 using the method of this invention with those of the control which was chain extended according to the second prior method earlier referred to, shows the improved properties of the polymers produced in accordance with this invention.

EXAMPLES 11–14

A series of fiber samples were prepared from different prepolymers. The first step chain extender in each case was methyliminobispropylamine. The second step chain extender was ethylene diamine. Procedure and molar ratios were similar to those used in Example 1 and each sample contained about 2.5% titanium dioxide by weight. Fiber properties were summarized below:

| Example | Glycols Used | Molar excess methylene bis (p-phenyl iso-cyanate), percent | Tenacity/ elongation | Chlorine 200 p.p.m., ½ hr. 60° C. | Heat 150° C, ½ hr., tenacity change, percent |
| --- | --- | --- | --- | --- | --- |
| 11 | 2/1 2000 MW poly (propylene adi-pate) glycol/2000 MW polypropylene-ether glycol. | 110 | 0.45/600 | Slight yellow | −10 |
| 12 | 1/1 2000 MW poly (propylene adi-pate)glycol/1000 MW polypropylene-ether glycol. | 110 | 0.52/480 | do | 0 |
| 13 | 2000 MW poly (propylene adipate) glycol. | 100 | 0.63/580 | No effect | 0 |
| 14 | 4/1 2000 MW poly (neopentyl/adi-pate)glycol/1000 MW polypropylene-ether glycol. | 100 | 0.74/550 | do | 0 |

EXAMPLE 15

(A) Prepolymer: 1200 g. of hydroxyl terminated and 2000 molecular weight poly(neopentyladipate) glycol was mixed with 410 g. of methylenebis(paraphenyl isocyanate). The mixture was then heated for 1 hour at 100° C. with constant agitation to form an isocyanate terminated prepolymer.

(B) First step chain extension: 215 g. of the above prepolymer was mixed with 500 g. of dimethylformamide and 5 g. of ethyleneglycol. The mixture was stirred at 75° C. for 2 hours. The mixture was then diluted with 4000 g. of dry dimethylformamide. Great care was taken to void any moisture contamination from the atmosphere.

(C) Second step chain extension: 20 grams of ethylenediamine was mixed with 100 g. of dimethylformamide, then slowly added to the mixture resulting from "B" above, which was constantly agitated. 1000 g. of pre-polymer from "A" above was mixed with 400 g. of di-methylformamide. This solution was then slowly added to the ethylenediamine containing solution previously prepared. Addition was halted when a viscosity of 75 poises was attained.

(D) Filament formation: The polymer solution resulting from "C" above was wet spun to form continuous filaments as in Example 1. The filaments had the following properties: tenacity, 0.30 g.p.d.; elongation 575%; and retractive force at 200% elongation, 0.11 g.p.d.

EXAMPLE 16

1000 g. of hydroxyl terminated polypropyleneetherglycol having a molecular weight of 2000 were mixed with 255 g. of methylenebis(paraphenylisocyanate). The mixture was heated to 105° C. with agitation and held at this temperature for 2 hours and 15 minutes to form an isocyanate terminated prepolymer.

This isocyanate terminated prepolymer was then chain extended in two steps, as in Example 1, and wet spun to form continuous filaments, again as described in Example 1. The filaments formed had the following properties: tenacity, 0.21 g.p.d.; elongation 820%; and retractive force at 200% elongation, 0.07 g.p.d.

EXAMPLE 17

2400 g. (1.2 moles) of dry 2000 molecular weight poly-neopentyladipate glycol was placed in a 4-liter resin pot with 300 g. (0.3 mole) of a dry 1000 molecular weight polypropyleneether glycol and 750 g. (3.0 moles) of methylenebis(paraphenylisocyanate). The mixture was blanketed with nitrogen to prevent absorption of atmospheric moisture and stirred continuously at a moderate shear rate during the entire reaction. Using an electric heating mantle, the temperature was increased slowly (about 0.5° C. per minute) from room temperature to about 70° C. at which point the electric current was turned off. At 60–70° C. an exotherm occurred which raised the final reaction temperature to about 100° C. The mantle insulation maintained the temperature at 95–100° C. for about 45 minutes before beginning to drop appreciably. This allowed sufficient time for complete reaction to occur. At about 80° C., 750 ml. of dry dimethylformamide was added and mixed thoroughly to reduce the prepolymer viscosity to a level convenient for pouring. The prepolymer was then stored in bottles under a nitrogen blanket until ready for use.

Four liters of dimethylformamide and 7.9 g. (0.055 mole) of methyliminobispropylamine were mixed in an 8-liter stainless steel beaker and prepolymer was poured in continuously with very high shear rate until about 120 g. of prepolymer was added. Then 29.4 g. (0.490 mole) of anhydrous ethylenediamine was added together with 1.0 g. (0.01 mole) of diethanolamine and 2000 ml. of dimethylformamide. Prepolymer was then added in a moderately fast, steady stream while mixing at a very high shear rate until the solution attained a viscosity of approximately 10 poises. Addition was then continued at a very slow rate until a viscosity to 60–80 poises was attained. At this point, 125 g. of a 50% dispersion of rutile titanium dioxide in dimethylformamide and 12.5 g. of 4,4'-butylidene-bis (6-tert-butyl-m-cresol) sold under the trade name Santowhite Powder by Monsanto Chemical Co., was added and blended for 5 minutes. The resulting solution was ready for spinning and comprised of about 18% polymer, 1% titanium dioxide, and 0.2% 4,4'-butylidene-bis (6-tert-butyl-m-cresol).

The extrusion unit for converting the polyurethane produced into continuous filaments consisted of two solution supply tanks which were connected in parallel and fed a common line through a T-connection, which line, in turn, fed the inlets of two metering pumps connected in parallel. Both pumps were driven by engaging opposite sides of the drive gear of a variable speed transmission. The outlet line from each pump led to a candle type filter packed so that the solution passed through a cotton/wool felt, a cotton baloon cloth, and a 20-mesh stainless steel screen. The outlet of each candle filter was connected to a spinnerette holder through a line, which was mounted on a swivel joint, which allowed moving the spinnerette holder in and out of the coagulation bath as needed. The spinnerette holder was packed so that the solution passed, in turn through a cotton/wool felt, a cotton balloon cloth, a 20-mesh stainless steel screen, a 100-mesh stainless steel screen, a perforated stainless steel support plate, and finally, a 20-hole or 60-hole spinnerette.

The two solution tanks were valved so that only one tank was used for spinning at any particular time. When the spinning tank was nearly empty, the valve under the second tank was opened at the same time that the valve under the first tank was closed. This allowed replenishing of each tank as it emptied and yet maintained a continuous supply of solution through the spinnerette without breaking the thread line.

In starting the extrusion process, a solution tank was first filled with polymer solution, the cover bolted on, and 5 p.s.i. of nitrogen pressure applied throughout the spin. The nitrogen maintained a constant positive pressure during the entire solution feed and prevented pump cavitation. The valve at the bottom of the tank was opened and the proper spinning pump or pumps (depending on number of spooled ends to be spun) engaged at the proper speed needed for the denier desired.

The spinnerette holder was attached to the candle filter outlet line only after the solution pumped through the line showed no air bubbles and appeared smooth and uniform. The moment the solution appeared at the spinnerette face the spinnerette was immersed in the coagulation bath. The individual coagulated filaments were pulled away from the spinnerette face as a group and passed through the various baths as presently described.

The coagulation bath consisted of a 20% solution of dimethylformamide in water at room temperature.

Once the thread was strung through the coagulation and extraction baths, the individual extruded filaments were separated by hand using a multitoothed stainless steel guide across the exit end of the coagulation bath.

The extraction unit consisted of a total of eight stainless steel trays in three tiers. Rolls convey the filaments in and out of the wash water and were geared so that the final wash tank exit roll had a surface speed 1.5 that of the first coagulation tank roll.

Inlets and outlets of wash water were arranged so that water flow was countercurrent to the filament motion for most efficient extraction.

The filaments after washing were continuously dried by passage through an infrared drying unit and collected on spools.

Whenever the singular of a reactant is used in the specification or claims, such term also included the plural. In addition, whenever the term diprimaryamine or disecondaryamine is used, it also embraces primary-secondary-amine.

What is claimed is:
1. The method of producing a polyurethane polymer solution which comprises
   (a) initially reacting in solution
      (i) a substantially difunctional isocyanate terminated prepolymer, having a molecular weight between about 1000 and 5500 and being the reaction product of at least one diisocyanate and at least one glycol selected from the class consisting of polyether and polyester glycols, with
      (ii) at least one moderately fast reacting chain extender, having a reactivity not higher than that of piperazine, selected from the class consisting of moderately fast reacting diamines and glycols, said moderately fast chain extender constituting between about 10 to 40 mole percent of the total amount of chain extender and being slightly less than the stoichiometric amount up to about 125 percent of the stoichiometric amount;
   (b) obtaining a still reactive intermediate polymer solution; and
   (c) further reacting
      (i) said intermediate polymer solution with
      (ii) an amount slightly less than, up to an amount slightly more than, the stoichiometric amount of a substantially difunctional isocyanate terminated prepolymer, having a molecular weight between about 1000 and 5500 and being the reaction product of at least one diisocyanate and at least one glycol selected from the class consisting of polyether and polyester glycols, and with
      (iii) a fast reacting straight chained, lower-alkyl, diprimary diamine chain extender containing carbon atoms in the range of two to six, inclusive, and wherein each of the two amino groups is attached to a terminal carbon atom.

2. The method of claim 1, wherein the molar ratio of the fast reacting chain extender to the moderately fast reacting chain extender is about 4:1.

3. The method of claim 1, wherein said moderately fast reacting chain extender is at least one diamine selected from the class consisting of hydrazine, monosubstituted hydrazines, symmetrically disubstituted hydrazines, piperazine, substituted piperazines, diamine piperazine, substituted diamine piperazines, cyclo-aliphatic diamines, methylimino-bis-aliphatic amines and sterically hindered diamines.

4. The method of claim 1, wherein said moderately fast reacting chain extender is piperazine or 1,4-diamino 2-methyl piperazine and said fast reacting chain extender is ethylene diamine.

5. The method of claim 1, wherein said prepolymers have a molecular weight between about 1000 and 4000;
   wherein said moderately fast reacting chain extender is 100 to 125 percent of the stoichiometric amount and is selected from the class consisting of moderately fast reacting diprimaryamines, disecondaryamines and glycols;
   wherein there is added to the further reaction a monofunctional amine in an amount not to exceed 10 mole percent of total chain extenders; and wherein the polyurethane contains prepolymer and chain extenders and monofunctional amine in a molar ratio of the stoichiometric ratio ±2 percent.

6. The method of claim 5, wherein the solvent of said solution is dimethylformamide;
wherein said prepolymers have a molecular weight of between about 1500 and 3500;
wherein said moderately fast reacting chain extender is methyliminobispropylamine;
wherein said fast chain extender is ethylene diamine; and wherein said molar ratio is the stoichiometric ratio ±1 percent.

7. The method of claim 1, wherein the prepolymers have a molecular weight of between about 1500 and 3500.

8. The method of claim 1, wherein the prepolymers are the reaction products of at least one glycol, having a molecular weight of between about 500 and 5000, with at least one diisocyanate selected from the class consisting of tolylene-2, 4-diisocyanate, p-phenylene diisocyanate, methylenebis (4-phenyl isocyanate), 1,6-hexamethylene diisocyanate, and 1,4-cyclohexylene diisocyanate.

9. The method of claim 1, wherein each of the chain extenders is added in slight excess of the stoichiometric amount.

10. The method of claim 1, wherein the molar ratio of the total prepolymers to the total chain extenders and chain terminators, if any, is within 2 percent of the stoichiometric ratio.

11. The method of claim 1, wherein said still reactive intermediate polymer solution has a viscosity of between about 40 and 700 poises and a solids content between about 20 and 25 percent.

12. The method of claim 1, wherein the solvent of the solution is selected from the group consisting of dimethylformamide, dimethylacetamide and dimethylsulfoxide.

13. The method of claim 1, wherein additional solvent is added in the further reaction step in an amount equal to about 3 to 6 parts per weight of the intermediate polymer solution.

14. The method of claim 1, wherein the entire solvent of the solution is present in the initial reaction step and the intermediate polymer solution has a viscosity of about 1–10 poises and a solids content of about 4–5 percent.

References Cited
UNITED STATES PATENTS

| | | | |
|---|---|---|---|
| 2,929,800 | 3/1960 | Hill | 260—77.5 |
| 3,044,990 | 7/1962 | Steuber | 260—77.5 |

ALLAN LIEBERMAN, Primary Examiner

U.S. Cl. X.R.

260—30.8, 75, 77.5, 858